United States Patent [19]

Flonc et al.

[11] Patent Number: 5,080,851
[45] Date of Patent: Jan. 14, 1992

[54] METHOD FOR STABILIZING COMPLEX COMPOSITE PREFORMS

[75] Inventors: Nicholas P. Flonc, E. Haven, Conn.; Michael W. Brace, Poway, Calif.

[73] Assignee: United Technologies Corporation, Hartford, Conn.

[21] Appl. No.: 578,817

[22] Filed: Sep. 6, 1990

[51] Int. Cl.$^5$ .................. B29C 43/20; B29C 45/14
[52] U.S. Cl. .................. 264/258; 264/324; 264/325; 156/222; 156/228; 156/283
[58] Field of Search ............ 264/113, 518, 258, 257, 264/324, 325, 237, 348, 122, 112; 156/497, 499, 228, 283, 285, 297, 299, 306.6, 313, 306.9, 309.6, 309.9, 222, 221, 224, 245, 307.1

[56] References Cited

U.S. PATENT DOCUMENTS

| | | | |
|---|---|---|---|
| 2,476,283 | 7/1949 | Castellan | 156/283 |
| 3,137,750 | 6/1964 | Gringras | 264/257 |
| 3,589,956 | 6/1971 | Kranz | 264/271 |
| 3,684,639 | 8/1972 | Keberle | 156/283 |
| 3,788,923 | 1/1974 | Solimar | 264/258 |
| 3,865,661 | 2/1975 | Hata | 156/283 |
| 4,195,112 | 3/1980 | Sheard | 264/122 |
| 4,470,862 | 9/1984 | More | 156/245 |
| 4,568,581 | 2/1986 | Peoples | 264/258 |
| 4,609,519 | 9/1986 | Pichard et al. | 264/510 |
| 4,663,225 | 5/1987 | Farley | 264/257 |
| 4,695,509 | 9/1987 | Cordova et al. | 264/257 |
| 4,741,873 | 5/1988 | Fischer et al. | 264/25 |
| 4,762,749 | 8/1988 | Johnson et al. | 264/257 |
| 4,800,058 | 1/1989 | Younes | 264/328.6 |
| 4,988,469 | 1/1991 | Reavely et al. | 264/258 |

Primary Examiner—Jay H. Woo
Assistant Examiner—Jeremiah F. Durkin, II
Attorney, Agent, or Firm—Sapone, William J.

[57] ABSTRACT

A method for forming stabilized preforms for complex composite articles is disclosed using a solid meltable uncatalyzed thermosetting resin as the stabilizing agent. The resin is applied to each layer of the preform and heated to melt the resin and bond the layers together. After cooling, the resin resolidifies but does not set and thereby holds the layers in the desired preform shape. The layers can be first formed into a flat sheet as a raw material from which shaped preforms can be made by cutting the sheet into sections which are placed over a mandrel and reheating to thereby remelt the solid resin to allow the preform to conform to the shape of the mandrel. Utilizing this process allows complex composite parts to be easily preformed and assembled prior to placement in a mold for resin injection molding, without inhibiting part strength as the resin is compatible with the injection resin and is cocatalyzed by the catalyst contained in the injection resin.

7 Claims, 5 Drawing Sheets

METHOD FOR STABILIZING COMPLEX COMPOSITE PREFORMS

TECHNICAL FIELD

This invention relates to methods for stabilizing complex composite preforms and more particularly to a method using a solid uncatalyzed resin for preform stabilization.

BACKGROUND OF INVENTION

Preforms for resin transfer molding (RTM) are typically composed of layers of oriented fiber material which are assembled in a stack and shaped prior to insertion into a mold for resin injection. Present methods for preparing the layers for molding involve stacking multiple layers of the fiber material with the desired fiber orientation, and then stitching or stapling the sheets together, to maintain the alignment and stabilize the fabric to prevent fraying.

The stack is then cut, outside of the stitching or stapling, to the desired shape usually using a laser cutter. The preform is then placed in a mold and resin injected to impregnate the fabric. These methods for preform stabilization however, are limited to 2-dimensional (flat) structures, and the preform cannot be shaped to conform to a complex part's contour without disturbing the stitching or stapling. If attempts are made to bend the preform, for example, to form a curved surface, the layers may separate or tear at the stitching. These methods are also quite labor intensive, increasing the cost for producing a complex shaped part.

Another method for stabilizing a preform involves spraying a hot melt adhesive onto the layers to hold them together. Usually, the dry fabric is coated in limited areas with a thin layer of the liquified thermoplastic polymer or alternatively, a fibrous polymer is placed between the layers and heat applied to melt the adhesive. The preform is then contoured to conform to the complex shape by melting and refreezing the polymer by the selective application and removal of a hot iron. This, of course, is a highly labor intensive operation.

Since the hot melt adhesive is a thermoplastic polymer, it has several disadvantages. First, the adhesive does not sufficiently wet the fibers to hold the adjacent layers together to maintain a shape after forming. Thus, if the preform is handled, such as during loading into the mold, it is possible that the fiber layers will shift. Also, such a thermoplastic material is not compatible with thermosetting resin systems typically used to produce parts via a resin transfer molding process. During injection, the thermoplastic forms pockets within the part which prevent resin infiltration, reducing part strength. Thus, to form complex composite articles utilizing hot melt adhesives requires sacrificing part strength.

OBJECTS OF THE INVENTION

It is an object of the present invention to provide a method for achieving 3-dimensional preform stabilization which is adaptable to automated processing.

It is a further object of the present invention to provide a method for stabilizing a preform having a complex shape without stitching or stapling or using a hot melt adhesive.

It is a further object of the present invention to provide a method which provides a stabilized preform which has a long storage life and sufficient handling strength to be manipulated without causing edge fraying.

I is yet another object of the present invention to provide a method of preform stabilization which also provides for debulking of the composite layers.

It is yet another object of the present invention to provide a method of preform stabilization which sufficiently stiffens the preform for cutting and trimming the preform prior to placement in a mold.

These and other objects of the present invention are achieved by providing a plurality of oriented fiber layers, stacking the layers, applying a solid uncatalyzed thermosetting resin between each layer, placing the stacked layers over a mandrel having the desired preform shape, forming the layers over the mandrel and heating the layers to melt the solid resin to lightly fuse the layers together, and, cooling to rigidify the layers to form a stabilized, rigid preform.

SUMMARY OF THE INVENTION

Figure 1:
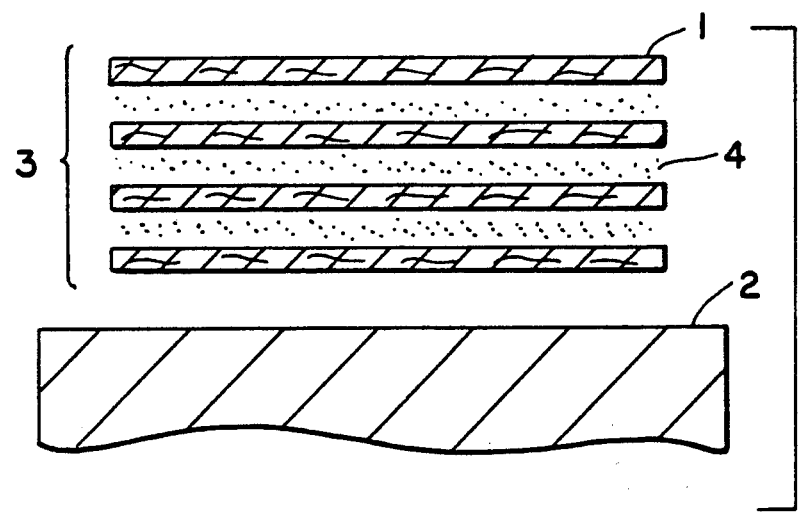
FIG. 1 is an exploded view of a plurality of oriented fiber layers with an uncatalyzed solid resin disposed therebetween.

Referring to FIG. 1, a plurality of fiber layers 1 are shown prior to placement on a surface 2 to provide a stack 3. Between each layers, a solid resin 4 is disposed.

The fiber layers are dry oriented fiber layers which typically have fibers oriented in the 0°, 90°, or 45° directions, relative to the part axis, or any combination thereof. The fibers may be made from aramid, (KEVLAR ™), graphite, carbon, glass etc., or combinations thereof, depending on the strength and characteristics desired of the finished product. The fibers may be in a strand, mesh or weaved construction, again depending on part requirements. The number of layers depends on the part to be produced and from 2 to 20 layers, or more may be used with this process.

The solid resin is an uncatalyzed thermosetting resin having a melting point of about 100°-350° F. Since no catalyst is present, the resin will not set when subject to heat. The resin is chosen to be compatible with the injection resin and is preferably essentially identical to the injection resin except for the absence of a catalyst. The uncatalyzed resin must be a solid at room temperature to provide sufficient stabilization for handling and cutting. The solid resin need not be identical to the injection resin but need only be compatible with the injection resin to prevent the pocket effect that occurs with thermoplastics. Thus, on resin injection, the solid resin will melt and mix with the injection resin, and be catalyzed by the catalyst in the injection resin. This prevents any weakening of the finished part.

On resin usable with the present invention is DOW-D.E.R. 662 which has a melting point of about 180° F. and is an uncatalyzed epoxy resin. A catalyzed injection resin usable with this material would be DOW-TAC-TIX ™ 1-2-3 epoxy resin or U.S. Polymerics E-905 epoxy resin. While exemplary, other resin systems would be useable with the present invention, For example, polyurethane, polystyrene, bismaleimide, polyimide, etc, may be used with the present process.

Generally the amount of solid resin applied to the layers is from about 1-15 percent by weight, preferably 1-5 percent, applied per layer. The resin may be sprinkled or sprayed onto each layer. Since the resin is compatible with the injection resin system, there is no danger if there is any non-uniformity in the covering of the sprayed resin.

Referring again to FIG. 1, the layers 1 and resin 4 are heated while on the surface 2 to melt the solid resin and then cooled to bond the layers together to form a storable bonded preform 3. Thus, the preform can be massed produced in a standard size and thickness and then later cut and shaped for forming complex parts.

A unique advantage of the present invention, is that the layers may be separated or formed, without heat, as the resolidified resin is somewhat frangible. In the raw state, most fabrics are quite pliable and easily drape to conform to complex shapes without splicing. Using thermoplastics, once formed, the preform cannot be tailored without reheating, or tearing will occur. Using the present invention, the flat preform may be formed, cold, using hand pressure or the equivalent, to match the contours of a 3-dimensional part. As the preform is manipulated, the bond releases in that area, without damage to the fibers, and while still preventing fraying at the ends of the sheets. After forming, the preform may be reheated to reinitiate bonding. This procedure greatly enhances formation of complex composite parts.

Figure 2:
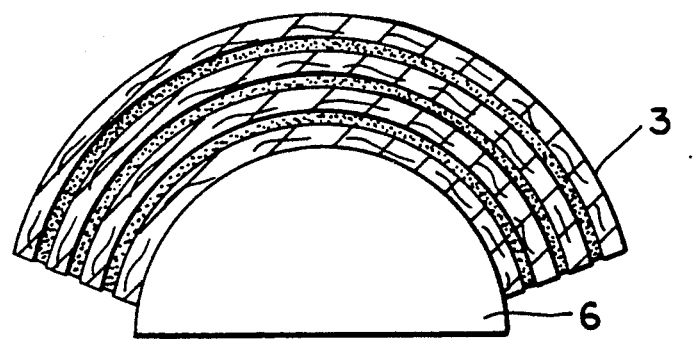
FIG. 2 is an exploded view showing the stacked layers being shaped about a mandrel.

Referring to FIG. 2, the preform 3 is placed over a mandrel 6 which is in the shape of the object to be formed. The mandrel may have means for heating while the preform is subject to light pressure to allow the preform to form about the mandrel, or the preform may be manipulated cold, to form about the mandrel. Preferably a vacuum bag (not shown) is used to form the preform to the shape of the mandrel. For example, the mandrel and preform could be placed in a vacuum bag, and vacuum drawn within the bag. Thus, atmospheric pressure would press the preform about the mandrel. The assembly could then be placed in an oven, at about 180° F., to melt the resin an bond the layers in the shape of the mandrel.

Heat is applied to liquify the solid resin and allow the layers to shift just enough to adapt to the contours of the mandrel. Upon cooling, the resin resolidifies and firmly holds the layers together.

An additional benefit is that during the compression and heating steps, the layers are substantially debulked to partially consolidate the layers. Debulking means that the layers are sufficiently compressed to partially consolidate the layers to the proper thickness to ease loading into a mold. For example, when a number of fiber layers are stacked, they may occupy a volume approximately 20 percent more than they would once they have been compressed. Thus, it is difficult to place such a preform into a net shape mold and to close the mold without disturbing the fiber layer orientation. Utilizing the present process, compressing and rigidifying the preforms prior to molding, eliminates debulking as a problem in RTM molding.

Figure 3:
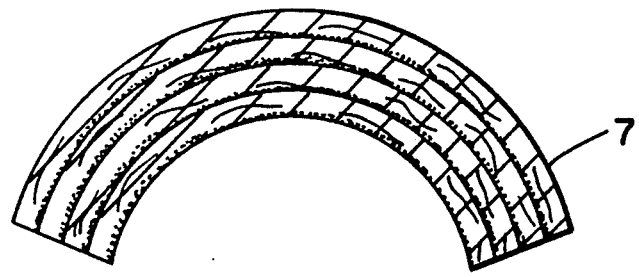
FIG. 3 is a cross-sectional view showing the completed preform, trimmed and ready for storage.

Referring to FIG. 3, a shaped preform 7 is shown after the resin has resolidified the preform into a rigid shaped structure. The thermosetting resin is of sufficient strength to allow the preform to be handled and indeed cut and trimmed to shape without disturbing the end fibers or causing any fraying.

Figure 4:
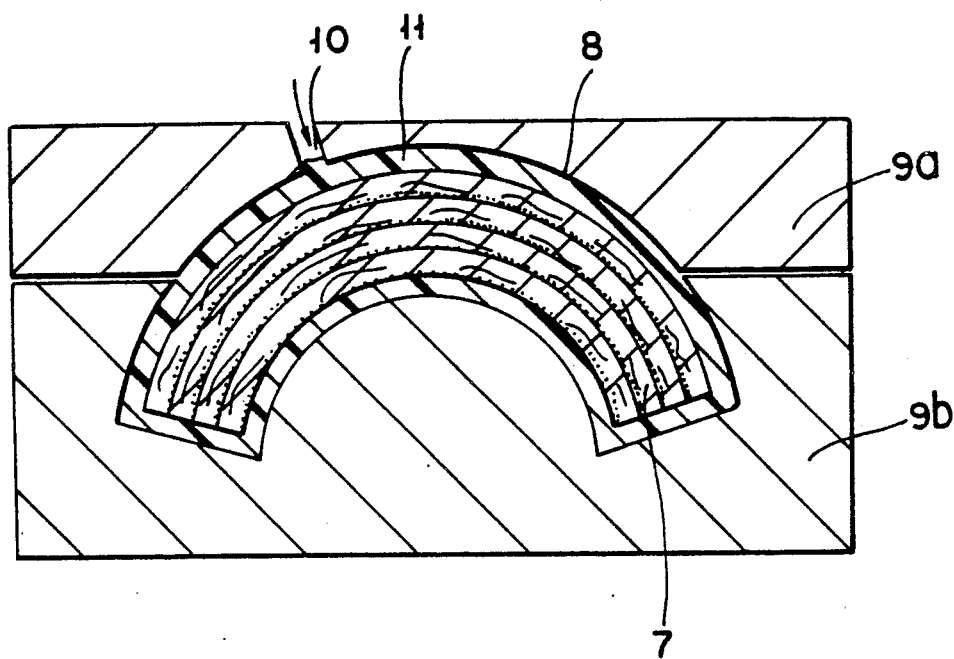
FIG. 4 is a cross-sectional view showing the preform disposed within a mold for resin injection molding.
Figure 5C:
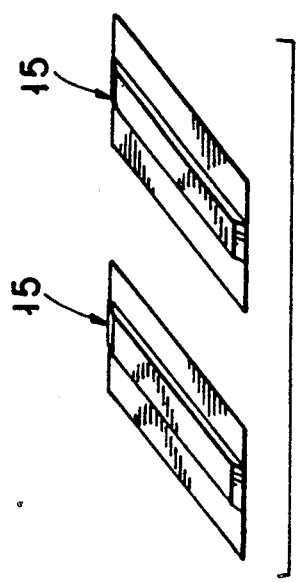
FIG. 5A-F are views of a plurality of preform subassemblies required to produce a complex part.
Figure 5F:
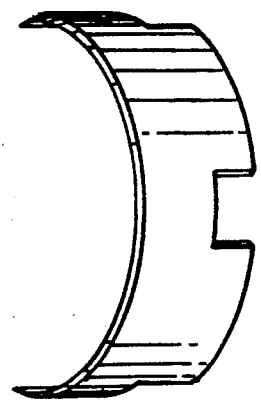
Figure 5B:
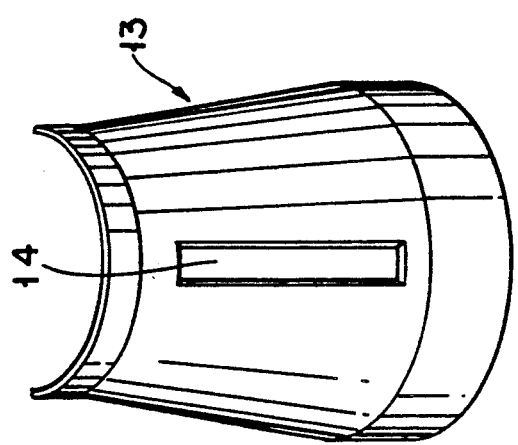
Figure 5E:
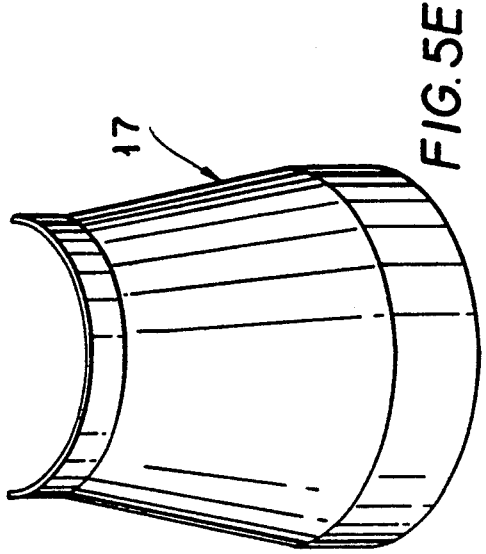
Figure 5A:
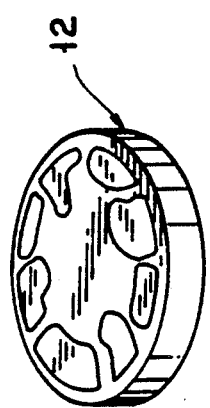
Figure 5D:
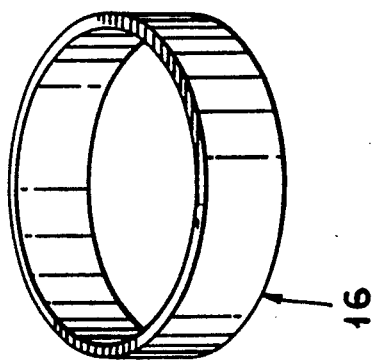

Referring to FIG. 4, the rigid preform 7 is disposed in a mold cavity 8 formed between a pair of mold halves 9a and 9b. The mold has injection ports 10 through which a catalyzed resin 11 enters the mold. The mold is preferably heated to the curing temperature, with the resin catalyst causing the stabilizing resin to co-cure with the injected resin. Thus, uniform resin infiltration and curing is achieved to obtain maximum part strength regardless of the amount of stabilizing resin used to assemble the preform.

An alternative method for producing the part would involve applying cut fabric layers directly to the mandrel, applying the solid resin in between each layer, and then heating and vacuum forming to shape and debulk the layers. Either method is more economical than the existing methods for producing preform structures for complex composite parts, yet for mass production, there are advantages to having a flat preform in a ready to shape form for producing different parts.

Referring to FIG. 5A-F, a complex composite part requires a plurality of sub-assembly preforms. These sub-assemblies comprise a molded disk 12; a pair of arcuate walls 13 which partially surround the disk, each wall having an opening 14; a number of locking strips 15 which are fitted into the openings 14 and lock into a center section (not shown); a preformed ring 16 for locking a lower portion of the walls 13; and, a pair of cover halves 17 which overlay the arcuate walls 13, locking strips and ring to form a unitary structure. Each sub-assembly is formed using the above described method for preform stabilization.

Figure 6:
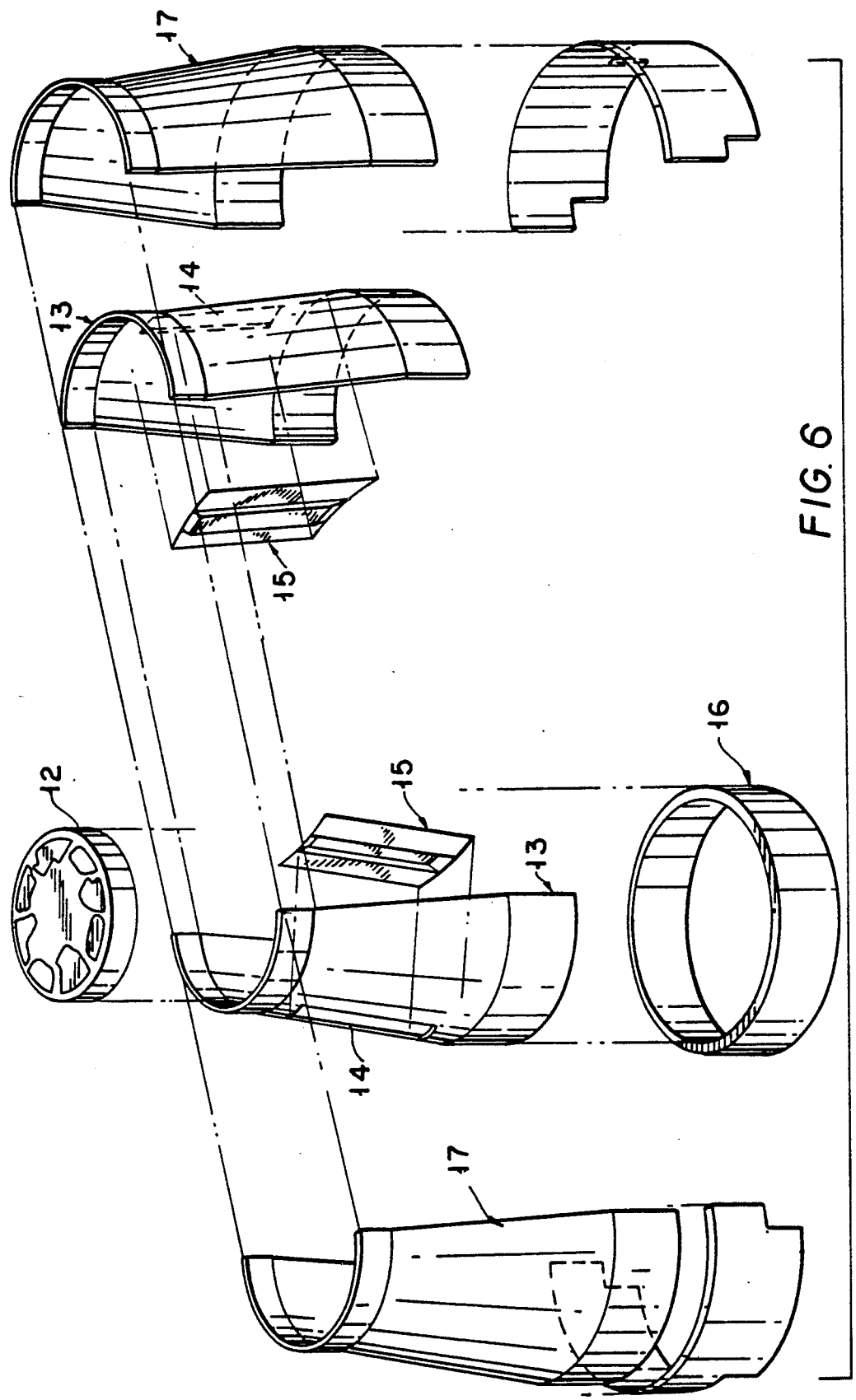
FIG. 6 is an exploded view showing the subassembly preforms required to produce the complex part.
Figure 7:
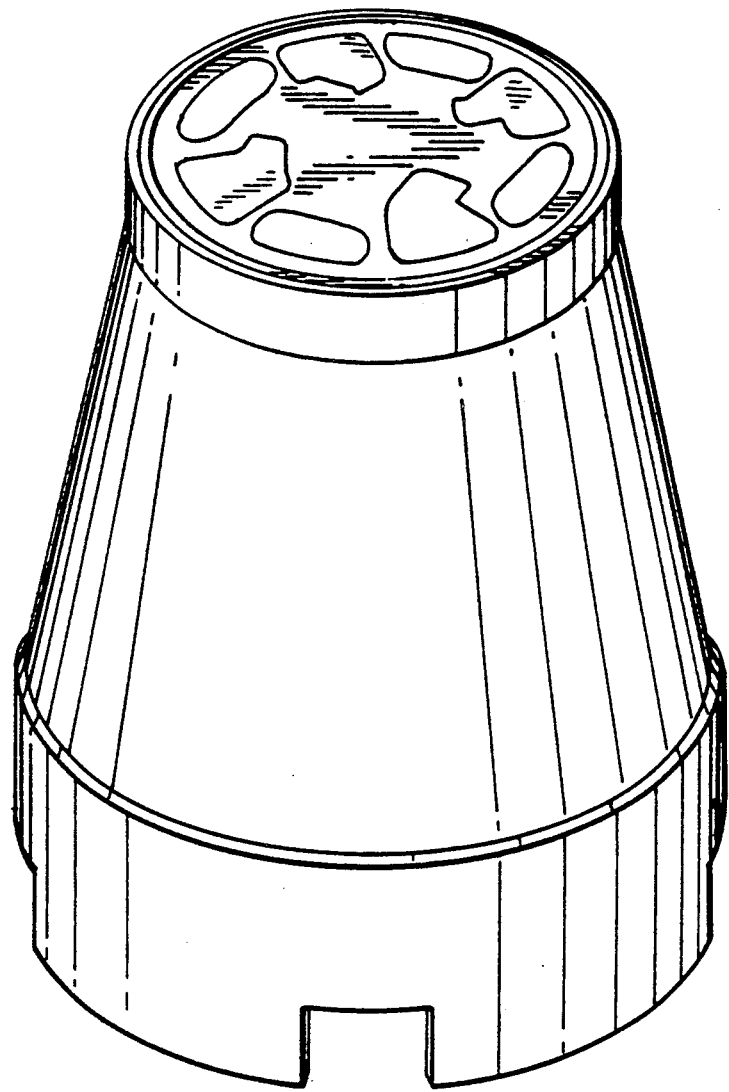
FIG. 7 is a view showing the assembled preform ready for molding.

Referring to FIG. 6, an exploded view of the sub-assemblies prior to on a mandrel (not shown). The preform sub-assembly's are assembled onto the mandrel using the solid resin between adjoining sub-assemblies. The complete assembly is then heated to provide a unitary preform, ready for resin injection. FIG. 7 shows the complete preform. To provide this part using any other process, i.e., stitching, stapling or hot melt adhesive, would be extremely difficult.

Using the present invention, such complex parts and sub-parts are much more easily manufactured and can in fact be mass produced for assembly without any labor intensive operations other than assembling the preforms to produce a preform assembly. The part also is produced without any weakening due to the presence of thermoplastic materials. Thus, the present invention is very useful in the preparation of complex composite parts and substantially more economical than any other methods presently available.

TABLE*

| TEST | PLYS | STABILIZING METHOD | RESULTS |
|---|---|---|---|
| 1 | 5 | 1¼" strips on plys 2 and 3, applied to edges, N-77** on ply edges | No compaction No shape retention |
| 2 | 3 | N-77 on all edges, 2" wide strip | No compaction No shape retention |
| 3 | 10 | 5% by weight D.E.R.*** | Good tack be- |

TABLE*-continued

| TEST | PLYS | STABILIZING METHOD | RESULTS |
|------|------|--------------------|---------|
|      |      | 662 uniformly applied over each ply | tween layers, compact preform, good shape retention |
| 4    | 11   | Stitched on one edge, adhesive applied to the other edge | Did not hold together |

*All plies placed on a heated table at 200°-250° F.
**Thermoplastic adhesive made by the 3-M Company
***Trademark of the DOW Chemical Company Referring to the table, various methods were evaluated for producing complex preforms using graphite and glass fibers, composed from a number of plies which were assembled to test the degree to which these methods obtain debulking (compaction) and retain shape.

In test No. 1, a first ply was placed on a heated table and a second ply was adhered to the first using strips of adhesive (glass prepreg). Another ply was laid over the second ply, using the same adhesive, and then another ply was laid over the third without any adhesive. A fifth layer, having a thermoplastic adhesive applied to the edges, was placed over the fourth ply. After stacking, it was found that the plies had not compacted at all and that the shape could not be retained.

In test No. 2, three plies were used and assembled using a hot-melt thermoplastic adhesive, N-77 made by 3-M Company which was placed on the edges only of each ply. Approximately a 2" wide strip was sprayed around the edges. Again, the plies were not compacted at all and the preform could not retain its shape.

In test No. 3, a ten-ply preform was produced utilizing D.E.R. ™ 662 uncatalyzed thermosetting epoxy resin applied at about 5 percent by weight over each ply. After only about 30 seconds on the heated table, good tack was exhibited between the layers. After removal, the layers were found to be well compacted and the shape was retained, sufficient to allow cutting and trimming of the preform without fraying.

In test No. 4, a dry blanket was produced utilizing 11 plys pre-stitched along one edge with a 1½" adhesive strip applied along another edge. The stitched edge also included the N-77 adhesive. The layers would not stay together to complete the test and thus, this method failed to produce a stabilized preform.

Utilizing the present invention allows producing complex composite articles without utilizing labor intensive operations or incompatible adhesive's or stitching operations. By providing a sheet preform for storage and using the preform to produce sub-assemblies which can be assembled into a preform assembly prior to molding, the variety and type of articles which can now be produced using RTM Molding is greatly expanded, and such parts can now be produced in an economic fashion. Thus, the applicant's invention is believed to be a substantial advance in the art.

While detailed embodiments of the present invention have been described, it will be understood by those skilled in the art that the invention is not limited to such embodiments and modifications may be made without varying from the scope of the invention.

We claim:

1. A method of molding using a stabilized preform comprising the steps of:
   (a) providing a plurality of oriented fiber layers,
   (b) stacking the layers,
   (c) applying a solid uncatalyzed thermosetting resin between each layer,
   (d) placing the stacked layers over a mold surface having a desired preform shape,
   (e) forming the layers over the mold surface,
   (f) heating the layers to melt the resin and lightly fuse the layers together,
   (g) cooling to rigidify the layers to form a preform, and
   (h) impregnating the preform with a thermosetting resin matrix containing a catalyst at a temperature at which the solid uncatalyzed thermosetting resin will melt and mix with the resin matrix to catalyze the melted uncatalyzed thermosetting resin therewith.

2. The method of claim 1 further comprising placing the preform in a mold and injecting the resin matrix into the mold.

3. The method of claim 1 wherein the oriented fiber layers are selected from the group consisting of graphite, aramid, glass or carbon fibers.

4. The method of claim 1 wherein the solid uncatalyzed thermosetting resin has a melting temperature of about 100° to 350° F.

5. The method of claim 1 wherein the solid uncatalyzed thermosetting resin is applied at between 1-15 percent by weight per layer.

6. The method of claim 1 wherein the mold surface is flat and further comprising the steps of storing the flat preform, cutting the stored preform to a desired size, applying the cut preform to a mandrel having a desired shape, and heating the preform to melt the solid resin to allow the preform to conform to the shape of the mandrel and cooling the preform to rigidify the preform in the shape of the mandrel.

7. The method of claim 1 wherein the solid uncatalyzed thermosetting resin is an epoxy resin.

* * * * *